(12) United States Patent
Rehmann

(10) Patent No.: US 6,755,277 B2
(45) Date of Patent: Jun. 29, 2004

(54) SPEAKER RESONANCE VOICEBOX

(75) Inventor: Mark L. Rehmann, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/921,081

(22) Filed: Aug. 2, 2001

(65) Prior Publication Data

US 2003/0024762 A1 Feb. 6, 2003

(51) Int. Cl.[7] .............................................. H05K 5/00
(52) U.S. Cl. ..................................................... 181/155
(58) Field of Search ................................ 181/148, 150, 181/153, 156, 155, 160

(56) References Cited

U.S. PATENT DOCUMENTS

| | | | | |
|---|---|---|---|---|
| 3,648,801 A | * | 3/1972 | Huszty et al. | 181/147 |
| 5,091,791 A | * | 2/1992 | Mitchell | 348/376 |
| 5,327,985 A | * | 7/1994 | Porzilli | 181/155 |
| 6,343,133 B1 | * | 1/2002 | Adamson | 381/340 |

OTHER PUBLICATIONS

Printed material from http://www.glenbrook.k12.il.us and its subdirectories, dated Jun. 11, 2001.

* cited by examiner

*Primary Examiner*—Kimberly Lockett
(74) *Attorney, Agent, or Firm*—Haynes and Boone, LLP

(57) ABSTRACT

A computer chassis includes a chassis wall and a speaker mounted on the chassis wall. An acoustic box is connected to the speaker. The box includes a sound reflecting distal wall including a plurality of stepped portions. Each stepped portion is of a different distance from the speaker than each other stepped portion.

24 Claims, 6 Drawing Sheets

SPEAKER RESONANCE VOICEBOX

BACKGROUND

The disclosures herein relate generally to a computer system and more particularly to a speaker in a computer chassis.

When a speaker is mounted inside a computer chassis without a speaker box, the resulting sound performance is poor due to the speaker sound energy being radiated inward and outward of the chassis. When a speaker box with a flat rear wall is employed to solve this problem, the reflected sound off the flat rear wall will have one base resonance frequency, causing a peak in the perceived speaker volume as the driving frequency increases.

Currently, a common approach to this problem is to use a soft material, such as foam, on the rear wall of the speaker box in order to reflect the sound back at various frequencies. This solution does vary the natural responses and avoids a peak in the perceived speaker volume, but it also absorbs overall sound energy which reduces sound quality and is relatively costly.

Therefore, what is needed is a speaker box that varies the natural responses and avoids a peak in the perceived speaker volume, but does not absorb sound energy and is less costly to manufacture.

SUMMARY

One embodiment, accordingly, provides multiple resonant frequency lengths between the speaker and a hard reflecting surface. To this end, a speaker apparatus includes a speaker and an acoustic box connected to the speaker. The box has a sound reflecting distal wall including a plurality of stepped portions of variable distances from the speaker.

A principle advantage of this embodiment is that it retains the advantages of a hard reflecting surface while being less costly than attaching a soft material to the rear speaker box wall. The stepped multi-leveled rear wall spreads the natural responses of the speaker and avoids a peak in the perceived speaker volume without absorbing as much sound energy as a soft material attached to the back of the speaker box.

DETAILED DESCRIPTION

Figure 1:
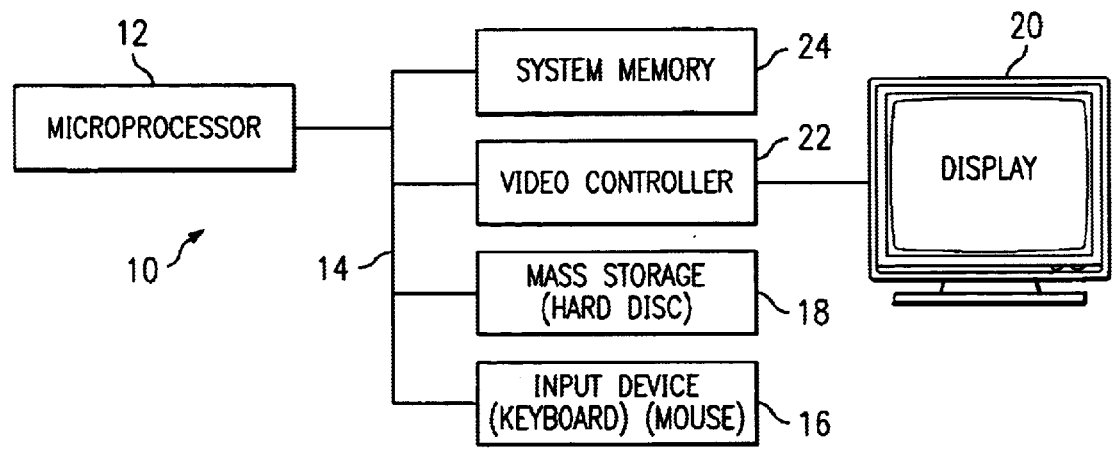
FIG. 1 is a diagrammatic view illustrating an embodiment of a computer system.

In one embodiment, a computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
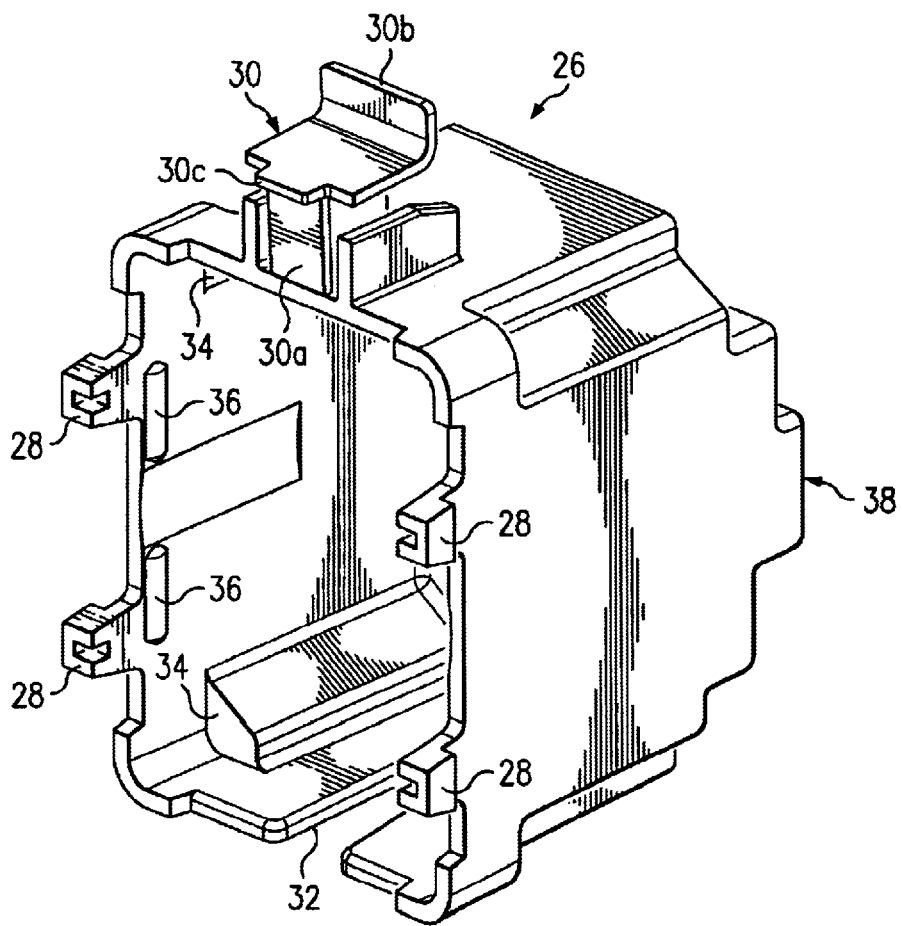
FIG. 2 is a perspective view illustrating an embodiment of an acoustic box.

An acoustic box 26, FIG. 2, includes a plurality of chassis mounting tabs 28, a chassis mounting clip 30, a speaker wire exit opening 32, a plurality of speaker mounting ledges 34, two of which are shown, a plurality of speaker retention tabs 36, two of which are shown, and a sound reflecting distal wall 38.

As illustrated, two ledges 34 are visible on one side of box 26. However, two additional ledges are also provided but are not in view in FIG. 2. The additional ledges are opposite the two illustrated ledges. Similarly, two retention tabs 36 are visible on the one side of box 26. Two additional retention tabs are opposite the visible tabs and are not in view in FIG. 2.

Mounting clip 30 includes a flexible arm 30a, a release tab 30b and a locking tab 30c. Locking tab is provided to engage a chassis on which the box 26 is mounted, to be discussed below.

Figure 3:
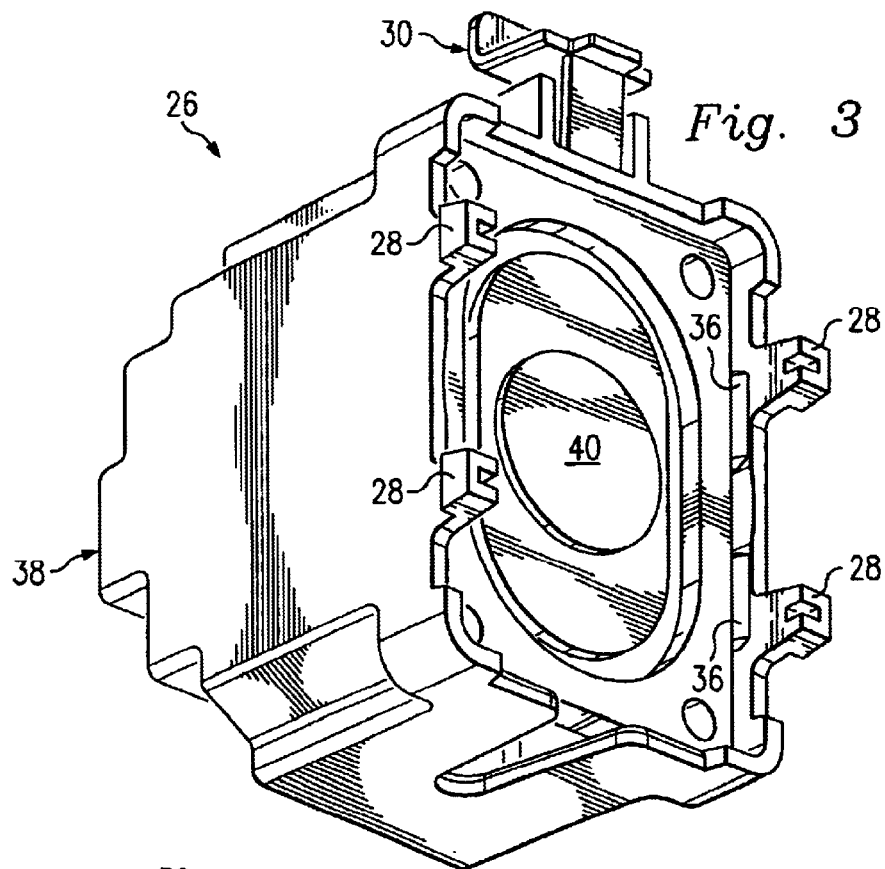
FIG. 3 is a perspective view illustrating an embodiment of the acoustic box having a speaker mounted therein.
Figure 4:
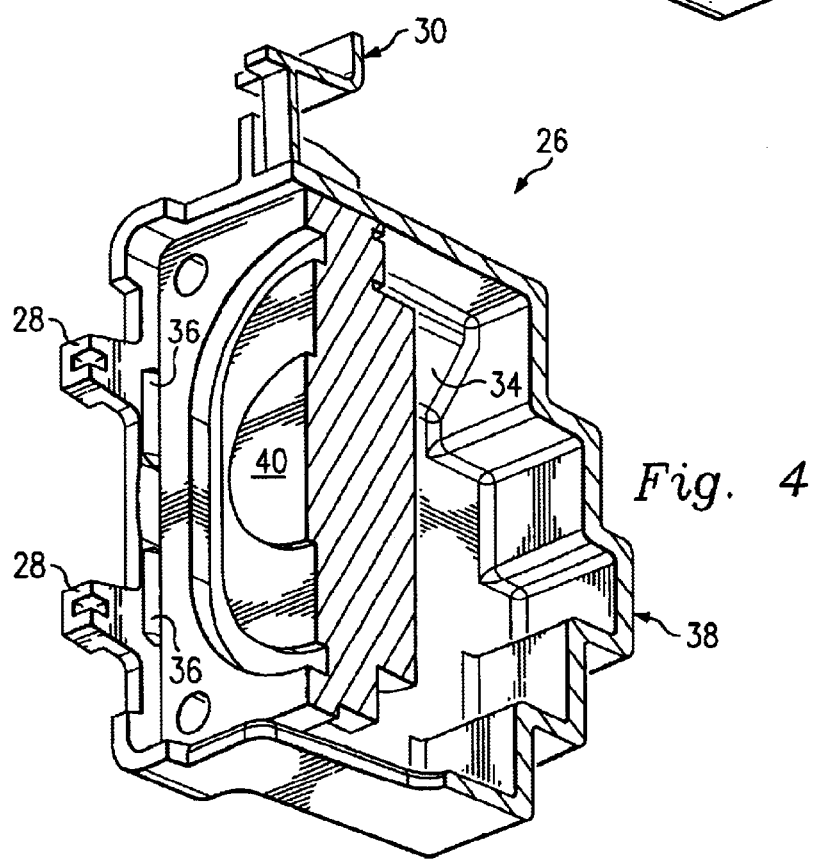
FIG. 4 is a partial perspective view illustrating the acoustic box and the speaker.
Figure 5:
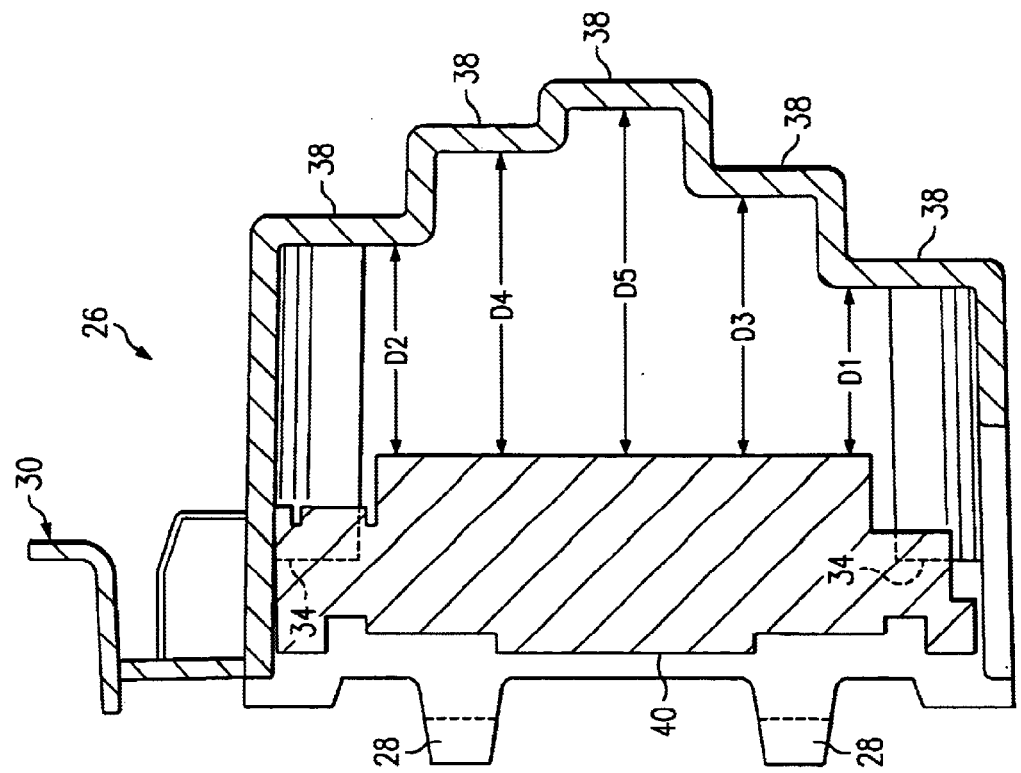
FIG. 5 is a cross-sectional side view illustrating the acoustic box and the speaker.

FIGS. 3, 4, and 5 illustrate the acoustic box 26, connected to a speaker 40. When assembled with acoustic box 26, each corner of speaker 40 sits on a speaker-mounting ledge 34. Speaker 40 is held in place by a snap-fit engagement with speaker retention tabs 36. FIG. 5 also shows a side profile of the sound reflecting distal wall 38, which has a plurality of stepped portions, each portion being of a different distance from the speaker than each other stepped portion.

Wall 38 includes the plurality of stepped portions, for example, portions 38a, 38b, 38c, 38d and 38e. Each of the portions 38a–e are substantially flat or planar and are substantially parallel to speaker 40. However, no two of the portions 38a–e are of equal distance from the speaker 40. For example, portions 38a–e are spaced from speaker 40 at respective distances D1–D5. The distance D1 is the least distance, D2 is greater than D1, D3 is greater than D2, D4 is greater than D3 and D5 is greater than D4.

Figure 6A:
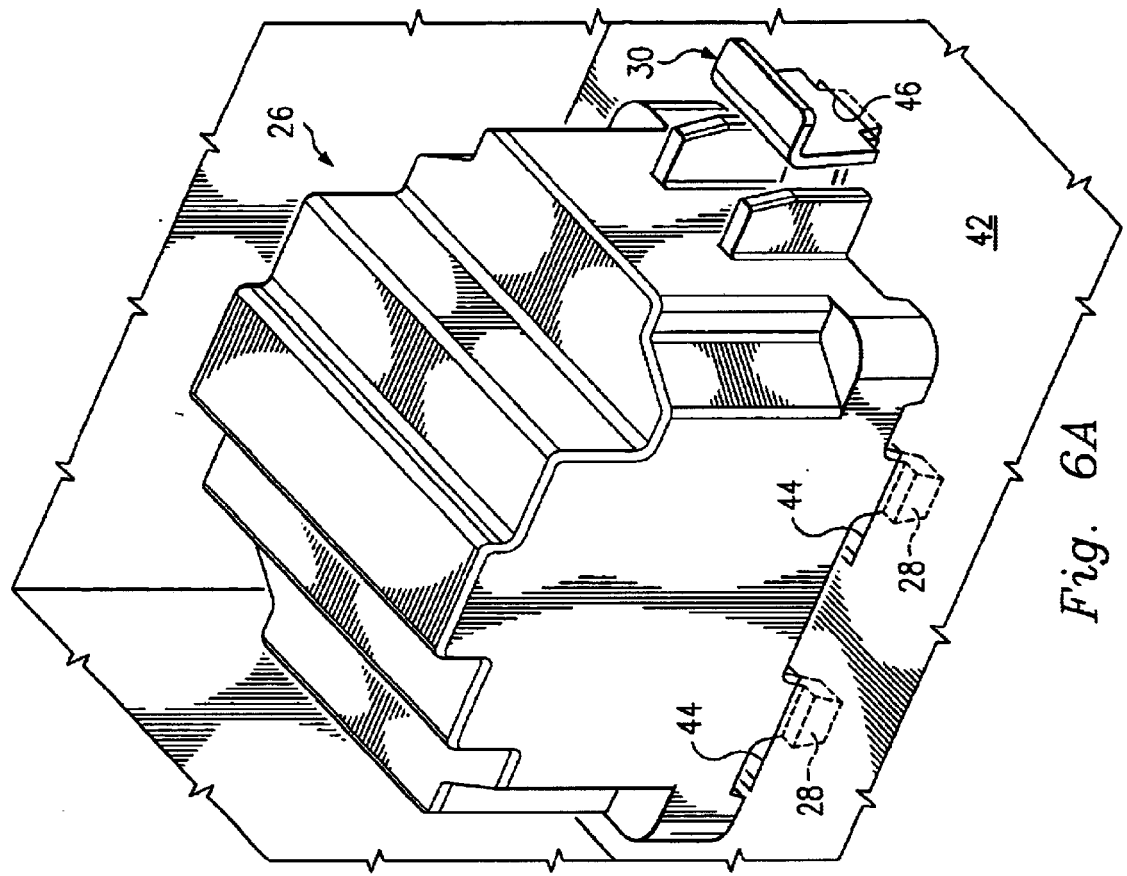
FIGS. 6A and 6B are views illustrating the speaker and the acoustic box mounted in a computer chassis.
Figure 6B:
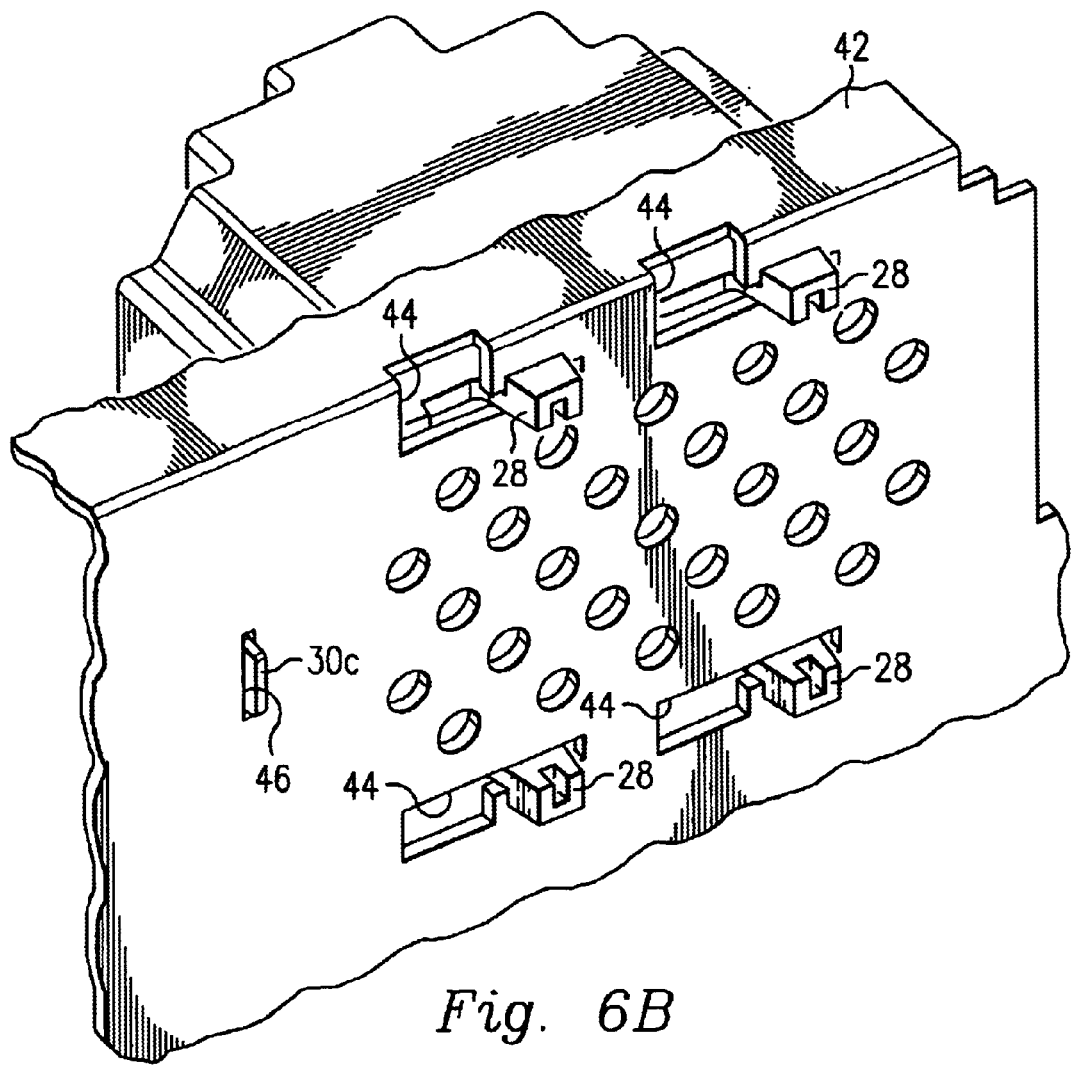

Most components of computer system 10 are mounted inside a chassis 42, FIGS. 6A and 6B. The speaker 40, connected to the acoustic box 26 as discussed above, can be mounted inside chassis 42. The chassis mounting tabs 28 mount tightly to chassis 42 through a set of speaker mounting slots 44, FIG. 6B. Locking tab 30c engages with mounting clip opening 46 to hold the speaker 40/acoustic box 26 assembly in place.

Chassis mounting tabs 28 are seated in slots 44. Acoustic box 26, containing speaker 40 is slidably moved relative to chassis 42 so that tabs 28 are locked into slots 44 and locking tab 30c of mounting clip 30 snaps into position and extends through clip opening 46. As a result, the acoustic box 26 is retained on chassis 42. When it is desired to remove box 26 from chassis 42, mounting clip 30 is flexed to withdraw locking tab from clip opening 46 and tabs 28 are free to slide in slots 44 to a position where box 26 may be separated from chassis 42.

Figure 7:
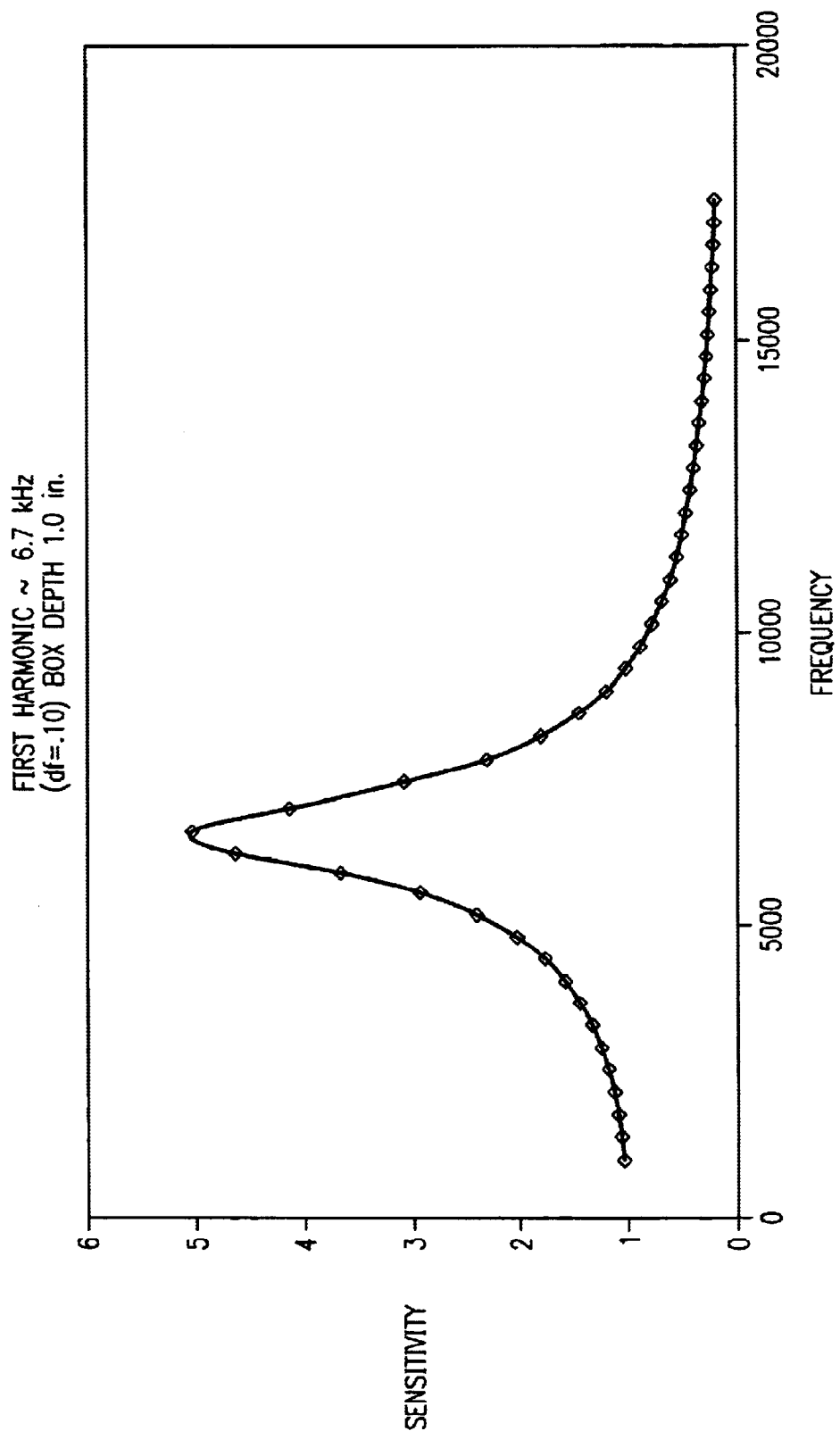
FIG. 7 is a graph illustrating a natural frequency response of an acoustic box having a reflecting distal wall that is flat.

FIG. 7 is a graph of the resonant frequency of a speaker/acoustic box assembly that has a sound reflecting distal wall that is a constant distance from the speaker, as disclosed in prior art assemblies of this type. The maximum in the curve results in a peak in the perceived speaker volume as the driving frequency is increased, which is an undesirable characteristic.

Figure 8:
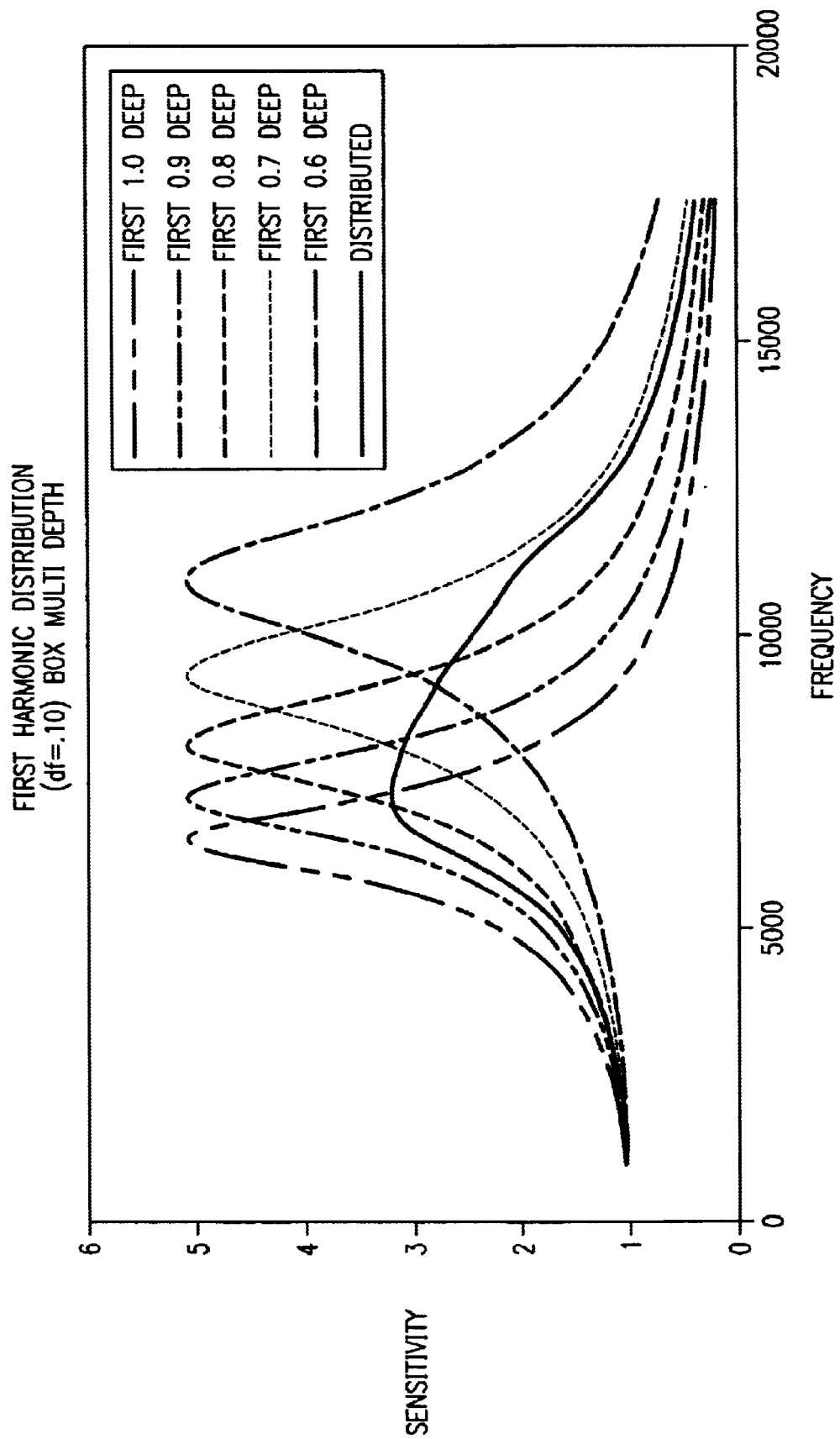
FIG. 8 is a graph illustrating the natural frequency response of the acoustic box having a sound reflecting distal wall including a plurality of stepped portions of variable distances from the speaker.

FIG. 8 is a graph of the resonant frequency of the speaker/acoustic box assembly, in accordance with the present disclosure with a sound reflecting distal wall the has a plurality of stepped portions, each portion being of a different distance from the speaker than each other stepped portion. Each stepped portion of the distal wall shows a maximum in its curve as the driving frequency is increased. However, because the stepped portions of the distal wall are all at different distances from the speaker, these maxima are spread out over a range of driving frequencies. The resulting distributed curve, FIG. 8, shows how this design smoothes out the natural response range of the speaker/acoustic box assembly.

As can be seen, the principal advantages of these embodiments are that the stepped voice box offers multiple resonant frequency lengths between the speaker and reflecting surface without soft media thus smoothing out the natural resonance range while maintaining the advantage of a hard reflecting surface. This approach also has a lower cost than a soft surface that must be mounted to a hard frame or box. The perceived overall increase in sound quality and volume is prominent.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A speaker apparatus comprising:
   a speaker; and
   an acoustic box connected to the speaker, the box having a sound reflecting distal wall including a plurality of stepped portions of variable distances from the speaker, each stepped portion being a different distance from the speaker than each other stepped portion, and each stepped portion being substantially parallel to each other stepped portion and to the speaker, whereby sound energy which is radiated rearward of the speaker and perpendicular to the speaker is segmented and reflected directly forward by the stepped portions, substantially perpendicular to the speaker.

2. The apparatus as defined in claim 1 wherein the speaker is in a snap-fit engagement with the acoustic box.

3. The apparatus as defined in claim 1 wherein the acoustic box includes a plurality of chassis mounting tabs.

4. The apparatus as defined in claim 3 wherein the acoustic box includes a chassis mounting clip with a bendable tab.

5. The apparatus as defined in claim 1 wherein the acoustic box includes a speaker wire exit opening formed therein.

6. The apparatus as defined in claim 1 wherein the acoustic box includes a plurality of speaker mounting ledges.

7. The apparatus as defined in claim 1 wherein the acoustic box includes a plurality of speaker retention tabs.

8. The apparatus as defined in claim 1 wherein each stepped portion reflects sound energy at a different resonant frequency length than each other stepped portion.

9. A computer chassis comprising:
   a chassis wall;
   a speaker mounted on the chassis wall; and
   an acoustic box connected to the speaker, the box having a sound reflecting distal wall including a plurality of stepped portions, each stepped portion being of a different distance from the speaker than each other stepped portion, and each stepped portion being substantially parallel to each other stepped portion and to the speaker, whereby each stepped portion reflects sound energy radiated rearward of the speaker back towards the speaker at a resonant frequency length different from each other stepped portion.

10. The chassis as defined in claim 9 wherein the speaker is in a snap-fit engagement with the acoustic box.

11. The chassis as defined in claim 10 wherein the acoustic box includes a plurality of chassis mounting tabs.

12. The chassis as defined in claim 11 wherein the acoustic box includes a chassis mounting clip with a bendable tab.

13. The chassis as defined in claim 12 wherein the acoustic box includes a speaker wire exit opening formed therein.

14. The chassis as defined in claim 13 wherein the acoustic box includes a plurality of speaker mounting ledges.

15. The chassis as defined in claim 14 wherein the acoustic box includes a plurality of speaker retention tabs.

16. The chassis as defined in claim 9 wherein sound energy radiated rearward of the speaker and perpendicular to the speaker is segmented and reflected directly forward by the stepped portions, substantially perpendicular to the speaker.

17. A computer system comprising:
   a chassis;
   a microprocessor mounted in the chassis;
   an input coupled to provide input to the microprocessor;
   a storage coupled to the microprocessor;
   a speaker mounted on the chassis; and
   an acoustic box connected to the speaker, the box having a sound reflecting distal wall including a plurality of stepped portions, each stepped portion being of a different distance from the speaker than each other stepped portion, and each stepped portion being substantially parallel to each other stepped portion and to the speaker, whereby a sound wave propagating rearward of the speaker is segmented and reflected forward by each stepped portion at a different time than any other stepped portion.

18. The system as defined in claim 17 wherein the speaker is in a snap-fit engagement with the acoustic box.

19. The system as defined in claim 17 wherein the acoustic box includes a plurality of chassis mounting tabs.

20. The system as defined in claim 19 wherein the acoustic box includes a chassis mounting clip with a bendable tab.

21. The system as defined in claim 18 wherein the acoustic box includes a speaker wire exit opening formed therein.

22. The system as defined in claim 17 wherein the acoustic box includes a plurality of speaker mounting ledges.

23. The system as defined in claim 22 wherein the acoustic box includes a plurality of speaker retention tabs.

24. The system as defined in claim 18 wherein sound energy radiated rearward of the speaker and perpendicular to the speaker is segmented and reflected directly forward by the stepped portions, substantially perpendicular to the speaker.

* * * * *